United States Patent [19]

Ruoff

[11] Patent Number: 4,720,316

[45] Date of Patent: Jan. 19, 1988

[54] METHOD FOR MAKING FLAT GASKETS

[75] Inventor: Eugen Ruoff, Urach, Fed. Rep. of Germany

[73] Assignee: Elring Dichtungswerke GmbH, Fed. Rep. of Germany

[21] Appl. No.: 880,709

[22] Filed: Jul. 1, 1986

[30] Foreign Application Priority Data

May 27, 1986 [DE] Fed. Rep. of Germany ....... 3617721

[51] Int. Cl.$^4$ ............................................. B32B 31/14
[52] U.S. Cl. ..................... 156/242; 156/243; 156/307.3; 277/1; 277/227; 277/235 B; 427/333; 427/387; 427/388.2
[58] Field of Search ............... 156/242, 243, 244.12, 156/305, 307.3, 307.7; 277/1, 227, 235 B; 427/209, 211, 333, 337, 387, 388.2, 409; 428/446, 447, 450

[56] References Cited

U.S. PATENT DOCUMENTS

| 3,135,625 | 6/1964 | Ingrassia | 427/333 |
| 4,201,804 | 5/1980 | Stecher et al. | 277/235 B |
| 4,478,887 | 10/1984 | Sommer et al. | 156/307.3 |
| 4,483,539 | 11/1984 | Bindel et al. | 427/387 |
| 4,499,135 | 2/1985 | Mitchell et al. | 277/235 B |
| 4,600,201 | 7/1986 | Lönne et al. | 277/1 |

Primary Examiner—Caleb Weston
Attorney, Agent, or Firm—Lorusso & Loud

[57] ABSTRACT

Method for making flat gaskets with a soft material layer on a sheet or plate-like support, comprising the following method steps:
applying a soft material mass comprising fillers and a binder as soft material layer onto the support,
if need be, compacting and/or drying the coated support,
impregnating this flat material with impregnating agents containing polysiloxanes which may be cross-linked by means of catalysts,
and, if need be, subsequently after-treating the impregnated sheet or plate by processes such as, for example, curing.

In order to so improve such a method that impregnating agents with a substantially longer pot life may be used, but as the same time the cross-linking reaction of the impregnating agent applied occurs sufficiently speedily and completely, it is proposed that the catalyst be added to the soft material mass prior to or during application onto the support, with the catalyst being distributed substantially homogeneously in the soft material layer formed and exhibiting an inert reaction towards its constituents, in particular, towards the binder emulsion, and that the soft material layer on the support already containing the catalyst be impregnated with polysiloxanes.

12 Claims, 1 Drawing Figure

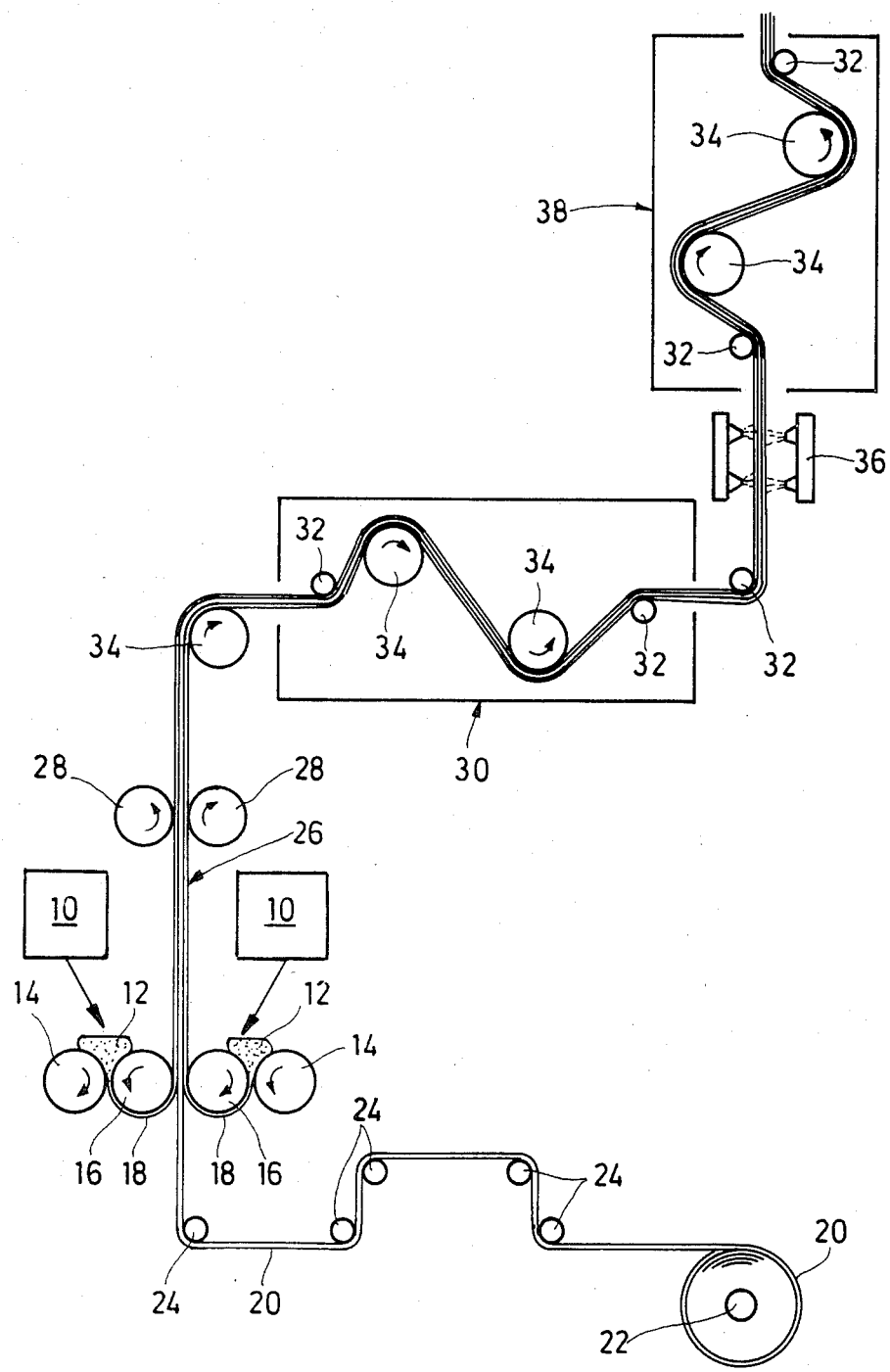

METHOD FOR MAKING FLAT GASKETS

The invention relates to a method for making flat gaskets with a soft material layer on a supporting sheet or plate, comprising the following method steps:
(a) applying a soft material mass containing fillers and a binder as a soft material layer onto the supporting sheet or plate,
(b) if need be, compacting and/or drying the coated sheet or plate,
(c) impregnating this flat material with impregnating agents containing polysiloxanes which may be cross-linked by means of catalysts,
(d) and, if need be, subsequently after-treating the impregnated sheet or plate by processes such as, for example, curing.

In particular, the invention relates to the manufacture of cylinder-head gaskets.

In the hitherto known methods, the soft material mass was applied to the supporting sheet or plate and, if need be, compacted and/or dried. The impregnation was then carried out subsequently with impregnating agents which in addition to the cross-linkable polymers such as the polysiloxanes, also contained the catalysts required for the cross-linking reaction. In the course of the flat gasket manufacturing process, these impregnating agent solutions posed a great problem since, on the one hand, the catalyst must exhibit a certain activity for the cross-linking reactions to practically reach completion within an appropriate amount of time, but, on the other hand, the pot life of the impregnating agents must be long enough to enable convenient processing of the impregnating agents. The hitherto solution consisted in adding to the impregnating agents catalysts with a reduced catalytic activity in order to eliminate gelatinization of the impregnating agent immediately after addition of the catalysts.

There are, however, limits to prolonging the pot life in this way, and, above all, the processing of more reactive polysiloxanes with this method has still not proven satisfactory. Especially if the more reactive polysiloxanes contain Si-H-groups, they already react with the atmospheric humidity, in the presence of the catalysts, and hydrogen is separated.

Blocking the catalytic activity of the catalyst to too strong a degree is, on the other hand, similarly not desirable since this would result, as in the systems operating without a catalyst, in a cross-linking of the polymer which is uncontrollable, too slow and possibly incomplete, which negatively affects the sealing properties of the flat gasket.

The object underlying the invention is to propose a method wherein the impregnating agents exhibit a substantially longer pot life, yet at the same time the cross-linking reactions occur sufficiently speedily, and in a controlled and, above all, complete manner.

This object is attained in accordance with the invention in a method of the kind described at the outset in that the catalyst is added to the soft material mass prior to or during application of the soft material mass onto the supporting sheet or plate, the catalyst being substantially homogeneously distributed in the soft material layer formed and exhibiting a more or less inert reaction towards its constituents, in particular, towards the binder, and in that the soft material layer on the supporting sheet or plate already containing the catalyst is impregnated with polysiloxanes.

The lifetime of the impregnating agent baths to be used in the inventive method is practically unlimited, and, in addition, the controlling of the impregnating agent baths may be dispensed with on account of elimination of the catalysts with the retarding reagents. The method may be applied with advantage independently of the sealing material used as support and soft material layer, in particular, also in the manufacture of flat gaskets in which a supporting sheet or plate is dispensed with.

In the method according to the invention, the impregnating agent may be prepared and made ready independently of the production process since storage no longer causes any problem on account of the practically unlimited lifetime of the impregnating agent.

The method itself is advantageously carried out in a continuous manner, but it is, of course, also possible to perform the method discontinuously. This means that the flat material need not necessarily be impregnated with the impregnating agent immediately following formation of the soft material layer, but that the flat material which is not yet impregnated may be stored for an interim and the impregnation may be carried out later.

Application of the impregnating agent may be carried out in the usual way by means of immersion, rolling, spraying and the like.

The separate application of impregnating agents and catalysts is already known from the pertinent literature, but there it is only after impregnation onto the soft material layer that the catalyst is applied to the flat material. A first disadvantage of this method is that a further operation is necessary in the manufacturing method, and a second disadvantage is that homogeneous distribution of the catalyst in the sealing material is not obtainable, which results in obvious drawbacks as far as the sealing properties of the flat material are concerned.

It was, furthermore, known from German Pat. No. 2,816,459 to saturate cardboard with cross-linking agents prior to the impregnation, in order to obtain a higher concentration of the cross-linking agent or catalyst in certain sections. This method does, however, basically differ from that according to the invention since no soft material layer is produced and also not homogeneous distribution of the catalyst or cross-linking agent is desired, but to the contrary a non-uniform distribution so that partially higher cross-linkings of the impregnating agent which, in addition, contained a further catalyst component, are obtained. Disadvantages of this method are, above all, the additionally required method step and the catalyst component which is still required in the impregnating agent itself.

An advantageous embodiment of the inventive method consists in using polysiloxanes of the formula

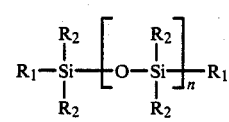

where $R_1$ and $R_2$ may be identical or different and stand for hydrogen, methyl, ethyl, propyl, isopropyl, butyl, isobutyl, vinyl, phenyl, tolyl, ethyl phenyl, propyl phenyl, isopropyl phenyl, butyl phenyl, isobutyl phenyl, xylyl. The hydrocarbon radicals in the polysiloxane chain may each be different both for groups $R_1$ and for groups $R_2$ so that more than two different hydrocarbon radicals may occur in the polysiloxane chain.

The inventive method proves particularly advantageous when very reactive polysiloxanes are used in which approximately 50% of the $R_2$ radicals are hydrogen. Included in these material groups are, for example, the methyl, ethyl, phenyl or methyl/ethyl hydrogen polysiloxanes.

It is preferable to use polysiloxanes whose degree of polymerization "n" is so low that they are still liquid and can therefore be used in solventless form for the impregnation. Consequently, drying or evaporation of the solvent after impregnation is eliminated so that the cavities or pores which often occur in the sealing are avoidable, which considerably improves the sealing properties of the flat gasket.

Since aqueous emulsions of binders are often used in the soft material masses, it is recommendable to employ hydrolysis-insensitive catalysts so that their activity is not impaired when added to the soft material mass. In particular, catalysts constituting a chelate compound have worked well.

Surprisingly, however, also catalysts whose hydrolysis sensitivity is less pronounced—but still existent— proved to be usable together with aqueous binder emulsions. Extraction tests on fully impregnated and cross-linked flat gasket material showed that the catalytic activity of such catalysts is not noticeably impaired by the aqueous binder emulsions. This is even applicable if heat is supplied to dry the soft material layer.

It is also possible to reduce the moisture influence by replacing the aqueous binder emulsions by binder solutions.

Preferred catalysts come from the group of titanium, zircon or platinum compounds, and it is advantageous to employ organic titanium compounds.

The titanium compounds which are to be used with advantage as catalyst are titanates or polytitanates with long-chain organic radicals. Examples of some suitable titanium compounds are triethanolamine titanate, octylene glycol titanate and titanium acetyl acetonate.

It is expedient to add the catalyst to the soft material mass in amounts of 2 to 15 percent by weight, preferably 6 percent by weight, based on the polysiloxane absorbed by the soft material (dry mass) during the impregnation. Complete cross-linking of the polysiloxane in an appropriate amount of time is achieved by these catalyst admixtures.

A smooth supporting sheet metal has worked very well as supporting sheet or plate. It is also advantageous to use profiled supporting sheet metals which, more particularly, may be of jagged configuration, with the jags which protrude from the supporting sheet metal projecting both upwardly and downwardly from the sheet metal plane if the support is to be coated on either side with soft material. This produces a particularly intensive bonding of soft material and supporting sheet metal.

These and further advantages of the invention will be explained in further detail in the following description of a manufacturing process with reference to the drawing.

The drawing shows, by way of example, the schematic procedural sequence of the manufacture of a cylinder head gasket using the inventive method.

The constituents of the soft material mass are first intimately mixed together. At this point, one recipe only for the soft material mass is given by way of example.

The invention is, of course, limited neither to the single constituents given here nor to their percentages:

80 parts by weight base and filler material comprised of slate flour 14 parts by weight asbestos-free fibers, in particular, organic fibers 6 parts by weight binder comprised of nitrile-butadiene rubber with 8 parts by weight water and 9 parts by weight toluol 1 part by weight of the commonly used vulcanization aids such as, for example, sulphur and the like 0.25 parts by weight tetraoctylene glycol titanate.

The slate flour stated here may, of course, be replaced by a number of other base and filler materials such as, for example, vermiculite or expanded graphite. Instead of the asbestos-free fibers, asbestos components may, of course, also be used; the nitrile-butadiene rubber used as binder may be employed in the form of a solution (for example, in toluol) or is replaceable by a completely different binder.

After mixing of the soft material mass in a mixer 10, the soft material mass 12 is passed onto two pairs of calender rollers 14 and 16, the calender rollers 16 being driven more quickly than the rollers 14. There is formed between each of the calender rollers 14 and 16, respectively, a so-called coat 18 comprised of soft material mass which adheres to the more quickly running roller 16 and is rolled by it onto a supporting sheet metal band 20. The supporting sheet metal may be a smooth sheet metal, but a supporting sheet metal with approximately triangular tongues formed by punching bent outwardly therefrom on either side, is preferred. This is not illustrated since it is known per se. Such jagged supporting sheet metals enable better adhesion of the soft material mass.

The supporting sheet metal band 20 is drawn off from a supply roll 22 and runs over several deflection rollers 24 before passing through the gap formed by the two calender rollers 16 where it is coated on either side with soft material mass.

The sealing material consisting of supporting sheet metal coated on either side with soft material mass and designated in its entirety by reference numeral 26 subsequently travels through between two drawing-off rollers 28 driven in opposite directions, whose circumferential speed is greater than the circumferential speed of the calender rollers 16, with the result that a friction, i.e., a slippage is produced between the supporting sheet metal band 20 and the calender rollers 16. The soft material mass of the sealing material 26 may also be compacted by the drawing-off rollers 28.

The sealing material subsequently passes through an oven 30 serving to dry the soft material mass and having several partly driven deflection rollers 32 and 34 arranged thereat.

The soft material layers of the sealing material 26 are then impregnated with an impregnating agent which may be applied by spraying, rolling or immersion of the sealing material, and which is preferably methyl hydrogen polysiloxane in solventless form. An impregnating device 36 equipped with spray nozzles is shown in the drawing.

The impregnation is followed by the step of curing in a further oven 38 which may correspond in its design to oven 30.

Sealing plates for the manufacture of flat gaskets such as cylinder head gaskets, may then be punched out of the thus obtained sealing material.

The inventive method may, however, also be performed on apparatus such as, for example, that disclosed in U.S. Pat. Nos. 4,478,887 and 4,520,068.

What is claimed is:

1. A method for making flat gaskets comprising the steps of:
    (a) admixing a soft gasket forming composite material including a binder, filler and a catalyst so that the catalyst is distributed substantially homogeneously in said composite material to form a homogeneous admixture, said catalyst exhibiting a substantially inert behavior toward the binder;
    (b) applying said admixture onto a flat support to form a flat sealing layer; and
    (c) impregnating the sealing layer with at least one polysiloxane which may be crosslinked by means of said catalyst.

2. The method according to claim 1 wherein said polysiloxane used for impregnating comprises a polysiloxane of the general formula:

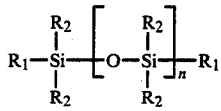

wherein $R_1$ and $R_2$, which may be identical or different, standing for hydrogen, methly, ethyl, propyl, isopropyl, butyl isobutyl, vinyl, phenyl, tolyl, ehtyl phenyl, propyl phenyl, isopropyl phenyl, butyl phenyl, isobutyl phenyl and xylyl.

3. The method according to claim 2 wherein approximately 50% of $R_2$ are hydrogen.

4. The method according to claim 1 wherein the polysiloxanes are liquid and are used in solventless form for the impregnation.

5. The method according to claim 1 wherein the catalyst which is insensitive to hydrolysis is used.

6. The method according to claim 1 wherein the catalyst is used in the form of a chelate compound.

7. The method according to claim 1 wherein the catalyst is selected from the group consisting of titanium, zircon and platinum compounds.

8. The method according to claim 1 wherein the catalyst comprises organic platinum compounds.

9. The method according to claim 1 wherein the catalyst consists of titanates or polytitanates with long-chain organic radicals.

10. The method according to claim 1 wherein the catalyst is added to said composite material in amounts of approximately 2 to 15% by weight based on the weight of the polysiloxanes absorbed by the sealing layer.

11. The method according to claim 1 wherein a smooth supporting sheet metal is used as support.

12. The method according to claim 1 wherein a profiled supporting sheet metal provided with protrusions bent outwardly from the support plane is used as support.

* * * * *